United States Patent Office 3,654,221
Patented Apr. 4, 1972

3,654,221
PROCESS FOR PRODUCING COLOR STABLE AND ODOR-FREE HETEROCYCLIC NITROGEN COMPOUND CONTAINING POLYMERS
Albert H. Greer, Haddonfield, N.J., assignor to Sybron Corporation, Rochester, N.Y.
No Drawing. Filed Dec. 30, 1968, Ser. No. 788,059
Int. Cl. C08f 7/12, 45/60
U.S. Cl. 260—45.9 R        9 Claims

ABSTRACT OF THE DISCLOSURE

A color stable, odor-free polymer is produced from monomers including polymerizable heterocyclic nitrogen compounds by reacting an aqueous dispersion of monomers in the presence of an organic, non-aromatic, water soluble additive containing at least one unsubstituted hydrazino or hydroxylamino radical in the free base form, having at least one amino group thereof unsubstituted.

This invention relates to polymeric compositions of homopolymers and copolymers of heterocyclic nitrogen compounds and its derivatives and a process for the production thereof. More particularly, this invention relates to color stabilized, odor-free homopolymers and copolymers of heterocyclic nitrogen compounds and to a process for forming said stabilized odor-free polymers.

BACKGROUND OF THE INVENTION

Homopolymers and copolymers of heterocyclic nitrogen compounds such as vinyl pyridine and other pyridine derivatives have been found useful in the textile industry where such polymers are used to improve the dyeability of polyolefin, textile fibers and sheets. In addition, these polymers have been used for rendering textiles and other absorbent materials, water proof and resistant to the attack of insects, larvae, fungi, bacteria and other parasitic micro-organisms. In addition, these polymers have been found to have useful applications in such other fields as the pharmaceutical field and photographic field. However, polymeric compositions formed from monomers of vinyl pyridine or other pyridine derivatives are known to have an objectionable persistent odor. For example, fibers treated with polymers of polymerizable heterocyclic nitrogen containing compounds have a characteristic objectionable odor which persists even after spinning, dyeing and storing of the treated fibers. Thus, for example, the use of a pyridine-containing polymer in dyeing a polyolefin textile material would be undesirable for many applications since the user of the textile would object to the pyridine odor which would persist even in the finished textile.

Various methods to eliminate the objectionable odor have ben attempted, however, these attempts have largely been unsuccessful. For example, forming the polymer from freshly distilled monomers failed to alleviate the odor problem. Other methods, such as subjecting the finished polymer to a long steaming process has met with limited success. However, steaming involves an additional processing step which increases not only the time required to produce the polymer, but increases substantially the cost of the final product. In addition, steaming may also lead to degradation of the polymer itself resulting in loss or substantial reduction of desired physical and chemical characteristics of the final polymeric composition.

Another problem associated with homopolymers and copolymers of polymerizable heterocyclic nitrogen containing compounds is the tendency of the finished polymers to be discolored. Such discoloration is undesirable particularly when the polymer is to be used in the preparation of lightly colored products.

Various compounds have been found to be effective as color stabilizers for polymerizable heterocyclic nitrogen compounds. For example, U.S. Pat. 3,248,363 to Farber et al., discloses the use of formaldehyde as a stabilizer for color inhibition. However, formaldehyde has no effect on the odor of the finished polymer. Hydroxylamines are disclosed as having been tried but found unusable since they are polymerization inhibitors and must be removed before polymerization.

It is therefore an object of this invention to provide an odor-free, color stabilized polymeric composition comprising the homopolymer or copolymer of a polymerizable heterocyclic nitrogen containing compound.

It is another object of this invention to provide a method for the production of odor-free color stabilized polymers comprising a polymerizable heterocyclic nitrogen containing compound.

These and other objects and advantages will become apparent to those skilled in the art upon consideration of the following detailed description and the novel features thereof will be particularly pointed out hereinafter in connection with the appended claims.

SUMMARY OF THE INVENTION

It has been discovered that organic, water soluble, non-aromatic compounds containing an available hydrazino or hydroxylamino radical serve to eliminate the objectionable odor and inhibit color formation in polymers comprising heterocyclic nitrogen containing compounds when used in accordance with this invention even though such compounds are known polymerization inhibitors. It has been further found that the finished product retains substantially all of the desired chemical and physical characteristics of conventional polymers comprising heterocyclic nitrogen compounds.

According to the process of this invention, color stabilized, odor-free polymers are produced according to the invention by forming an aqueous phase and monomer phase comprising a heterocyclic nitrogen monomer. The monomer phase is added to the aqueous stage with stirring to form an emulsion or suspension of the monomer phase in the aqueous phase. The aqueous suspension or emulsion is heated to polymerization temperature, in the range of from about 20° C. to about 100° C., in nonoxidizing atmosphere and in the presence of from about 0.25% to about 3% based on the weight of the heterocyclic nitrogen containing monomer of a deodorizing color stabilizing additive as discussed in greater detail below, for a period sufficient to allow for polymerization of the monomers, such period normally ranging from about 30 minutes to about 10 hours depending on polymerization temperature. Polymerization is carried out in a non-oxidizing atmosphere such as for example, nitrogen, helium, argon and the like. The color stabilizing, deodorizing additive may be present in the aqueous phase at the start of polymerization, added with the monomer phase, or introduced during the course of polymerization, preferably before the polymer has formed a well defined solid state. The final product is in the form of spheroids or particles which are readily separated from the aqueous phase.

Among the monomers which are utilized in this invention to form color stabilized, odor-free polymers are the heterocyclic nitrogen compounds having a vinyl group present in any of the several positions in the pyridine nucleus, for example, 2-vinylpyridine, 4-vinyl pyridine, 3-vinyl pyridine and the like. Further examples of useful monomers are the vinyl alkyl pyridines such as 2-methyl-5-vinyl pyridine, 4-methyl-5-vinyl pyridine and the like. Other polymerizable heterocyclic nitrogen compounds useful to form color stable, odor-free polymers in accordance with this invention are the vinyl quinolines such as for example, 1-vinyl quinoline, 2-vinyl quinoline and the like. The vinyl methyl quinolines such as 2-methyl-5-vinyl quinoline, 4-methyl-5-vinyl quinoline and the isoquinolines, such as for example, 1-methyl or 3-methyl-5-vinyl isoquinoline have also been found useful in this invention. Other vinyl substituted nitrogen containing heterocyclic monomers useful in this invention are the vinyl pyrroles and alkali derivatives thereof, alkali derivatives of the vinyl pyridines, the pyridazines, the pyrazines and the alkali derivatives thereof and the like.

The polymeric composition of this invention may be formed by the copolymerization of polymerizable, heterocyclic nitrogen compounds and any other unsaturated monovinyl monomers which will copolymerize sufficiently with heterocyclic nitrogen monomers to form a water insoluble polymeric composition. Such monomers as styrenes and the substituted styrenes, the acrylamides and the N-alkali acrylamides, the acrylates and methacrylates and their alkali and amino esters, the vinyl oxylates, the vinyl maleates, the vinyl malinates, the vinyl succinates, the vinyl ethers and the like may be copolymerized with the vinyl pyridine monomers to form a polymeric composition in accordance with this invention.

In forming copolymers of heterocyclic nitrogen compounds and unsaturated monovinyl compounds, it has been found that the relative proportions of the monomers may vary widely depending upon the desired characteristics of the finished polymeric composition. It has been found that useful compositions can be made in accordance with this invention, where the composition of monomer phase comprises at least about 0.5 percent of a heterocyclic nitrogen compound based on the weight of the monomers.

As is common practice in the polymerization art, it is normally preferred to incorporate in the monomer phase a polymerization reaction initiator to catalyze and accelerate polymerization of the monomers. Suitable reaction initiators which catalyze the polymerization of the monomers in this invention are well known in the art and generally include free radical generating compounds, such as for example, organo alkali metals, copper salts or organic acids, azo compounds, organic peroxides and the like. For the purpose of this invention, it is preferred to use as a reaction initiator azo-bis-isobutyronitrile. The amount of reaction initiator employed is generally in the range between 0.05 and about 10% based on the weight of the monomers. It is preferred to add the reaction initiator dissolved in one of the monomer compounds although it may be added separately if desired.

As is common in the art of polymerization, a suspending agent may be incorporated in the aqueous phase for the purpose of promoting formation of polymer spheres or beads of uniform particle size. Although the suspending agent is not required for the production of color stable, odor free polymers according to this invention, it is preferred to use a suspending agent so that the finished product is in the form of substantially uniform beads which make the product more attractive and easier to package and handle. Such suspending agents and their use are well understood by those skilled in the art and any of the known suspending agents may be selected for inclusion in the aqueous phase. Useful suspending agents are, for example, alkyl cellulose derivatives, gum arabic, gelatin, starch, colloidal magnesium, aluminum silicate and the like.

The color stabilizing, deodorizing additive of this invention is an organic non-aromatic, water soluble compound having at least one available radical selected from the group consisting of the hydrazino and hydroxylamino radicals. Although the mechanism of the reaction is not fully understood, it is believed that the hydrazino radical (—NH—NH$_2$) and the hydroxylamino radical (—NH—OH)

reacts with the odor causing bodies of the vinyl pyridine monomers to prevent the objectionable odor in the finished product. In addition, the additive of this invention inhibits the formation of color bodies during and subsequent to polymerization thereby stabilizing the color of the finished polymeric composition. It has been found that in order to be operative in this invention, the compound carrying the hydrazino or hydroxylamino radical must be water soluble so as not to enter into the monomer phase and thereby act as a polymerization deactivator or inhibitor. By the same token, since both the hydrazino and hydroxylamino radical carrying compounds are known to be polymerization deactivators or inhibitors, the proportions of the additives must be controlled in order to avoid an excess of hydrazino or hydroxylamino radicals which will interfere with polymerization. It has been found that when the additive is present in amounts in excess of about 3% by weight of the heterocyclic nitrogen monomeric compound, incomplete polymerization will result. On the other hand, sufficient additive must be present in order to effectively prohibit formation of the objectionable odor and inhibit the formation of color producing bodies in the finished product. It has been found that about 0.25% of the additive is sufficient to inhibit the pyridine odor and stabilize color. The preferred concentration of additive is between about 0.5% and about 2% by weight of the heterocyclic nitrogen monomeric compound.

In order to constitute an effective deodorizing and color stabilizing additive in accordance with this invention, the compound carrying the hydrazino or the hydroxylamino radical must be non-aromatic. Test results show that aromatic compounds containing available hydrazino or hydroxylamino radicals inhibit polymerization and that the final product obtained when an organic additive is used has a detectable odor.

As mentioned above, the hydrazino or hydroxylamino radical of the additive must be available in order for the additive to be operable in accordance with this invention. By "available" it is meant that at least one of the hydrazino or hydroxylamino radicals of the additive are in the free base form and at least one amino group thereof is unsubstituted. As such, the additive is able to react in some manner with the odor and color bodies of the polymeric composition to thereby reduce or inhibit the objectionable odor and to inhibit color formation. For example, compounds of the type R—NH—NH—R where R is other than hydrogen, are unsuitable for use in this invention because even though the hydrazino radical is in a free base form, the amino groups are substituted. Thus, the hydrazino radical is not available within the meaning of the term as used herein. By the same token, non-substituted hydrazino salts and hydroxylamino salts are inoperative in this invention as color stabilizing and deodorizing additives because they are not in the free base form. However, the salts can be converted to their free base form by neutralizing the salt form in a buffering system on the high alkaline side so as to generate the free hydrazino or hydroxylamino base or by passing the salt through a basic ion exchange resin in the regenerated form, thereby to remove the salt anion and make the hydrazino or hydroxylamino radical available in accordance with this invention.

Among the compounds containing available hydrazino radicals which are useful as deodorizing and color stabilizing additives in this invention are: commercially available hydrazine hydrate, the free base of hydrazine, the alkyl hydrazines, such as methyl hydrazine, ethyl hydrazine and the like, unsymmetrical dialkyl hydrazines, such as N,N-dimethyl hydrazine and N,N-diethyl hydrazine and the like, aminoguanidine, diaminoguanidine, triaminoguanidine, alkyl derivatives of aminoguanidine, such as methyl aminoguanidine, ethyl aminoguanidine and the like, the nitro substituted aminoguanidines, such as nitroaminoguanidine, the free base of semi-carbazide and thiosemi-carbazide and the like.

Among the compounds containing available hydroxyl-amino radicals which are useful in this invention is the free base of hydroxylamine and alykl substituted hydroxylamines, such as for example, O-methyl-hydroxylamine and the like.

The following examples set forth by way of illustration specific embodiments of this invention, and it is to be understood that the invention is not to be unduly limited by the specific examples shown.

Example 1

In a three liter polymerization flask, equipped with a stirrer, thermometer and nitrogen inlet tube and surrounded by a water bath, were placed 1600 ml. of water and 4.0 grams of an alkyl cellulose derivative suspending agent. The mixture was heated to 70° C. until complete solution had taken place marked by the formation of a clear solution. A monomer phase consisting of a mixture of 600 grams of distilled 2-vinyl pyridine and 200 grams of 2-methyl-5-vinyl pyridine with 8.0 grams of azo-bis-isobutyronitrile dissolved therein as a reaction initiator was added to the water phase in the polymerization flask, thereby to form a suspension of the monomer phase in the aqueous phase. Polymerization was carried out by heating the suspension for two hours at 70° C. under nitrogen with stirring, whereupon 16 grams of 70% solution of hydrazine hydrate was added. The polymerization reaction was continued for an adidtional three hours at 70° C. under nitrogen and with stirring whereupon the polymerization was complete. The resulting product was in the form of solid spheroids and was separated from the aqueous phase, washed with distilled water and dried under vacuum at 65° C. for 18 hours. The resulting polymeric composition was completely free of any pyridine odor and was white in appearance indicating that the polymer was substantially free of color bodies. In this case, the hydrazine hydrate constituted 1.4% by weight of the pyridine monomers.

As a comparison run, polymerization was conducted in precisely the same manner as set forth above, except that no hydrazine hydrate was added in the course of the polymerization. The resulting polymer was dark yellow in appearance and had a pronounced objectionable odor which became even more accentuated upon heating of the polymer.

Example 2

An aqueous phase consisting of 1600 ml. of water and 4.0 grams of an alkyl cellulose derivative were placed in a polymerization flask as in Example 1 and heated to 70° C. until complete solution of the alkyl cellulose derivative had taken place. At this point, 8.0 grams of 70% hydrazine hydrate was added followed by the monomers mixture comprising 400 grams of distilled 2-methyl-5-vinyl pyridine and 400 grams of distilled 2-vinyl pyridine having dissolved therein 9.6 grams of azo-bis-isobutyronitrile as a polymerization initiator. The suspension was heated with stirring under nitrogen for five hours at 70° C. until polymerization was complete. Solid spheroids were then separated from the aqueous phase, washed with water and vacuum dried at 65° for 18 hours. The resulting polymer was completely free from any pyridine odor and was white in appearance.

Example 3

An aqueous phase consisting of 1600 ml. of water and 4 grams of an alkyl cellulose derivative was prepared in the manner of Example 1. The aqueous phase, a monomer phase consisting of 400 grams of 2-methyl-5-vinyl-pyridine and 400 grams of distilled 2-vinyl-pyridine containing 9.6 grams of azo-bis-isobutyronitrile as a reaction initiator was added to the aqueous stage with stirring and under nitrogen. The suspension thus formed was heated at 70° C. for two hours and 100 ml. of 16% aqueous solution of semi-carbazide free base was added. The 16 grams of semi-carbazide was equivalent to 2% by weight of the monomer phase. After the semi-carbazide addition, the mixture was heated, maintaining the nitrogen atmosphere, with continuous stirring at a temperature of 70° C. for another 3.5 hours at which polymerization was complete. The resulting spheroids were filtered, washed with water and vacuum dried at 65° C. for 18 hours. There was no trace of pyridine odor in the finished white polymeric composition.

The semi-carbazide additive of this example was prepared by passing an aqueous solution containing sufficient quantities of semi-carbazide hydrochloride to provide 16 grams of semi-carbazide free base per 100 ml. of water through a strong base anion exchange resin such as for example, a cross-linked polyvinyl benzyl quaternary trimethylammonium exchange resin identified as Ionac A540. The resin had been first regenerated with 5% of sodium hydroxide in water at a dosage rate of 4 lbs./cubic foot of resin. After passing through the ion exchange resin, the semi-carbazide was in the free base form and the hydrazino radical was available for inhibition of color and odor in the finished polymeric composition.

EXAMPLE 4

An aqueous phase consisting of 800 ml. of water and 4.5 grams of an alkyl cellulose derivative was prepared in the manner of Example 1. One hundred ml. of an 8% aqueous solution of aminoguanidine free base, prepared as in Example 3 by passing an aqueous solution of aminoguanidine hydrochloride through the ion exchange resin of Example 3, was added to the aqueous phase and the mixture heated at 70° C. until a clear solution was obtained. A monomer mixture of 200 grams of 2-vinyl pyridine and 200 grams of 2-methyl-5-vinyl pyridine containing 4.8 grams of azo-bis-isobutyronitrile was added to the aqueous phase. The aminoguanidine additive constituted 2% by weight of the heterocyclic nitrogen monomers. Polymerization was conducted at 70° C. under nitrogen with continuous stirring for five hours whereupon polymeriation was complete. The resulting solid spheroids were washed with water and dried under vacuum at 65° C. for 18 hours. The resulting white polymeric composition was completely free of pyridine odor.

EXAMPLE 5

An aqueous phase consisting of 1800 ml. of water with 4.1 grams of an alkyl cellulose derivative and 9.0 grams of gum arabic was prepared in the manner of Example 1. To the aqueous phase was added 8.0 grams of 70% solution of hydrazine hydrate as a color stabilizing and deodorizing additive. The aqueous phase containing the additive was heated at 70° C. with stirring until a clear solution was obtained whereupon a monomer phase consisting of 640 grams of 2-vinyl pyridine, 160 grams of styrene and 11.2 gramsof azo-bis-isobutyronitrile as a reaction initiator dissolved in the styrene was added and the entire mixture was heated for 2 hours at 70° C. followed by 3 hours at 75° C. at which point polymerization was complete. The resulting white solid spheroids were removed by filtration, washed with water and vacuum dried for 18 hours at 65° C. The finished polymeric composition was completely free of pyridine odor.

EXAMPLE 6

In a polymerization kettle as described in Example 1 was placed an aqueous phase consisting of 1800 ml. of water containing 3.5 grams of an alkyl cellulose derivative and the mixture heated with stirring at 70° C. until a clear solution had been achieved. A monomer phase consisting of 560 grams of distilled 2-vinyl-pyridine, 120 grams of acrylonitrile and 120 grams of styrene having dissolved therein 14.4 grams of azo-bis-isobutyronitrile as a reaction initiator was added to the aqueous phase and polymerization carried out at 70° C. for two hours. At this point, 6.0 grams of 70% hydrazine hydrate was added, and the polymerization continued for an additional 3.5 hours, whereupon polymerization was complete. The resulting solid spheroids were removed by filtration, washed with water and dried under vacuum at 65° C. for 18 hours. The resulting polymeric composition was free of pyridine odor and was white in appearance.

EXAMPLE 7

An aqueous phase consisting of 1200 ml. of water and 4.0 grams of an alkyl cellulose derivative was prepared in the manner of Example 1 and the mixture heated to 70° C. until a clear solution was obtained. To the aqueous phase was added 6 grams of 70% hydrazine hydrate followed by the addition of a monomer phase consisting of 420 grams of 2-vinyl-pyridine, 90 grams of sytrene and 90 grams of dimethylaminoethyl-methacrylate having 1.8 grams of azo-bis-isobutyronitrile as a reaction iniator dissolved therein. The aqueous phase-monomer phase mixture was heated for 5 hours under nitrogen at 70° C. with continuous stirring whereupon polymerization was complete. The resulting spheroids were removed by filtration, washed with water and vacuum dried at 65° C. for 18 hours. The polymeric composition thus obtained was completely free of pyridine odor and was white in appearance.

EXAMPLE 8

In a polymerization kettle as described in Example 1 was placed 1600 ml. of water, 4.0 grams of an alkyl cellulose derivative as a stabilizer and the mixture heated until a clear solution had been obtained. To this aqueous phase was added 800 grams of 2-methyl-5-vinylpyridine having 6.4 grams of azo-bis-isobutyronitrile, as a reaction initiator dissolved therein. The aqueous phase-monomer phase mixture was heated under nitrogen at 60° C. with stirring for about two hours at which point 8.0 grams of thio semicarbazide was added as the deodorizing additive. Polymerization was continued for an additional three hours at 70° C. At the end of this period polymerization was complete and the spheroid particles were removed by filtration, washed with water and dried under vacuum at 65° C. The resulting polymeric composition was free of pyridine odor.

EXAMPLE 9

In a polymerization kettle similar to the one described in Example 1 was placed an aqueous phase consisting of 1800 ml. of water 5.0 grams of an alkyl cellulose derivative as a stabilizer and an aqueous phase was heated at 70° C. until a clear solution was obtained. At this point 16.0 grams of unsymmetrical N,N-dimethyl hydrazine was added. To the aqueous phase was added a monomer phase consisting of 400 grams of 2-vinyl pyridine and 400 grams of 2-methyl-5-vinyl pyridine having 9.8 grams of azo-bis-isobutyronitrile as a reaction initiator dissolved therein. Polymerization was carried out under nitrogen for four hours at 70° C. with continuous stirring followed by an additional two hours at 90° C. At the end of this period polymerization was complete and the spheroid particles removed by filtration washed with water and dried under vacuum at 65° C. for 18 hours. The resulting white polymeric composition had no detectible pyridine odor.

Example 10

In a polymerization kettle as described in Example 1 was placed an aqueous phase consisting of 1600 ml. of water, 4.0 grams of an alkyl cellulose derivative as a stabilizer, and the mixture heated at 70° C. until a clear solution was obtained. To this was added 200 ml. of a 4% hydroxylamine free base solution. The hydroxylamine free base was prepared in a similar manner as in Example 3 by passing hydroxylamine hydrochloride through a strong base anion exchange resin. To the aqueous phase was added a monomer phase consisting of 800 grams of 2-methyl-5-vinylpyridine having 6.4 grams of azo-bis-isobutyronitrile as a reaction initiator dissolved therein. Polymerization was carried out under nitrogen at 70° C. for 5 hours with continuous stirring. At the end of this period polymerization was complete and the resulting spheroid particles were removed by filtration, washed with water and dried under vacuum at 65° C. The resulting polymeric composition was free of residual pyridine odor and was white in appearance indicating that the polymer was substantially free of color bodies.

While the invention has been described in connection with specific embodiments thereof, it will be understood that it is capable of further modification, and this application is intended to cover any variations, uses or adaptations of the invention. It will, therefore, be recognized that the invention is not to be considered as limited to the precise embodiments described, but is to be interpreted as broadly as permitted by the appended claims.

I claim:

1. A method for producing a color stable, odor-free polymer by the polymerization of an aqueous monomer suspension comprising a polymerizable, heterocyclic nitrogen compound having at least one vinyl group substituted on a carbon atom of the heterocyclic ring, the invention comprising carrying out said polymerization in the presence of from about 0.5 percent to about 3.0 percent, based on the weight of said heterocyclic nitrogen compound, of an odor and color inhibiting additive, said additive being an organic, non-aromatic, water soluble compound selected from the group consisting of hydrazine, hydrazine hydrate, the alkyl hydrazines, unsymmetrical dialkyl hydrazines, aminoguanidine, diaminoguanidine, triaminoguanidine, alkyl derivatives of the aminoguanidines, the nitro substituted aminoguanidines, semi-carbazide and thiosemi-carbazide, hydroxylamine and alkyl substituted hydroxylamines.

2. The process of claim 1 wherein a monomer phase comprising at least about 0.5 weight percent of a polymerizable, heterocyclic nitrogen compound having at least one vinyl group substituted on a carbon atom of the heterocyclic ring, is combined with an aqueous phase thereby to form an aqueous monomer suspension, maintaining said suspension at polymerization temperature and in a non-oxidizing atomsphere, thereby to initiate polymerization of said monomer phase, introducing to said suspension from about 0.5 percent to about 3.0 percent of said odor and color inhibiting additive, maintaining said suspension in said non-oxidizing atmosphere and at polymerization temperature in the presence of said additive for sufficient time to substantially complete polymerization of said monomer phase, and separating said polymeric composition from said aqueous phase whereby said polymeric composition is substantially color and odor-free.

3. The process of claim 2 wherein said polymerizable heterocyclic nitrogen compound is selected from the group consisting of vinyl pyridines, vinyl quinolines, vinyl isoquinolines, vinyl alkyl pyridines, vinyl methyl quinolines, vinyl pyrroles, vinyl pyridazines, vinyl pyrazines and alkali derivatives thereof.

4. The process of claim 1 wherein said aqueous phase comprises from about 0.5 percent to about 3.0 percent of said additive based on the weight of said heterocyclic nitrogen compound having at least one vinyl group substituted on a carbon atom of the heterocyclic ring, of said monomer phase, and said monomer phase is combined with said aqueous phase to form a suspension of said monomer phase in said aqueous phase, heating said suspension in a non-oxidizing atmosphere to a polymerization temperature of about 20° C. to about 100° C. and maintaining said temperature to effect polymerization of said monomer phase and separating said polymeric composition from said aqueous phase.

5. The process of claim 4 wherein said polymerization temperature is between about 70° C. to about 75° C.

6. The process of claim 4 wherein said monomer phase comprises at least about 0.5 weight percent of polymerizable heterocyclic nitrogen compound selected from the group consisting of vinyl pyridines, vinyl quinolines, vinyl isoquinolines, vinyl alkyl pyridines, vinyl methyl quinolines, vinyl pyrroles, vinyl pyridazines, vinyl pyrazines and alkali derivatives thereof.

7. The process of claim 4 wherein said aqueous phase comprises a compound selected from the group consisting of hydrazine, hydroxylamine, semi-carbazide, thiosemi-carbazide, triaminoguanidine and unsymmetrical N,N-dimethyl hydrazine.

8. A color stabilized, odor-free polymeric composition comprising the polymerization reaction product of a monomer system comprising a heterocyclic nitrogen compound having at least one vinyl group substituted on a carbon atom of the heterocyclic ring, said polymerization being carried out in the presence of from about 0.5 percent to about 3.0 percent of an organic, non-aromatic, water soluble compound selected from the group consisting of hydrazine, hydrazine hydrate, the alkyl hydrazines, unsymmetrical dialkyl hydrazines, aminoguanidine, diaminoguanidine, triaminoguanidine, alkyl derivatives of the aminoguanidines, the nitro substituted aminoguanidines, semi-carbazide and thiosemi-carbazide hydroxylamine and alkyl substituted hydroxylamines, said percent of said compound being based on the weight of polymerizable heterocyclic nitrogen compound of said monomer system.

9. The composition of claim 8 wherein said monomer system comprises at least about 0.5 weight percent of a polymerizable compound selected from the group consisting of vinyl pyridines, vinyl quinolines, vinyl isoquinolines, vinyl alkyl pyridines, vinyl methyl quinolines, vinyl pyrroles, vinyl pyridazines, vinyl pyrazines and alkali derivatives thereof.

References Cited
UNITED STATES PATENTS

| | | | |
|---|---|---|---|
| 3,072,585 | 1/1963 | Milionis et al. | 260—22 |
| 3,103,497 | 9/1963 | McCarty et al. | 260—41 |
| 3,166,525 | 1/1965 | Perry | 260—29.6 |
| 3,243,459 | 3/1966 | O'Shea | 260—569 |
| 3,248,363 | 4/1966 | Farber et al. | 260—45.9 |
| 3,344,144 | 9/1967 | Kobayashi | 260—290 |
| 3,374,242 | 3/1968 | Kelley | 260—309.5 |
| 3,390,139 | 6/1968 | De Benneville | 260—78.5 |

DONALD E. CZAJA, Primary Examiner

R. A. WHITE, Assistant Examiner

U.S. Cl. X.R.

260—29.6 HN, 88.3 R